(12) United States Patent
Nystad

(10) Patent No.: US 10,089,783 B2
(45) Date of Patent: Oct. 2, 2018

(54) GRAPHICS PROCESSING

(71) Applicant: ARM Limited, Cambridge (GB)

(72) Inventor: Jorn Nystad, Trondheim (NO)

(73) Assignee: Arm Limited, Cambridge (GB)

( * ) Notice: Subject to any disclaimer, the term of this patent is extended or adjusted under 35 U.S.C. 154(b) by 70 days.

(21) Appl. No.: 15/219,114

(22) Filed: Jul. 25, 2016

(65) Prior Publication Data

US 2017/0039762 A1     Feb. 9, 2017

(30) Foreign Application Priority Data

Aug. 3, 2015 (GB) .................................. 1513663.3

(51) Int. Cl.
*G06T 17/20* (2006.01)
*G06T 1/20* (2006.01)
*G06T 15/00* (2011.01)

(52) U.S. Cl.
CPC ............... *G06T 17/20* (2013.01); *G06T 1/20* (2013.01); *G06T 15/005* (2013.01)

(58) Field of Classification Search
None
See application file for complete search history.

(56) References Cited

U.S. PATENT DOCUMENTS

| 6,094,503 A | 7/2000 | Hara | |
| 8,599,202 B1 * | 12/2013 | Legakis | G06T 17/20 345/423 |
| 2014/0063012 A1 * | 3/2014 | Madani | G06T 17/20 345/423 |
| 2015/0332487 A1 * | 11/2015 | Williams | G06T 17/20 345/441 |

OTHER PUBLICATIONS

Combined Search and Examination Report dated Jan. 13, 2016 in Great Britain Patent Application No. GB1513663.3.

* cited by examiner

*Primary Examiner* — Andrew G Yang
(74) *Attorney, Agent, or Firm* — Vierra Magen Marcus LLP

(57) ABSTRACT

A graphics processing pipeline comprises a tessellation stage that is configured to tessellate a patch into tessellation primitives. When tessellating the patch, the tessellation stage generates tessellation vertex coordinate pairs that define within a parameter space the locations of vertices of the tessellation primitives for the patch. The tessellation vertex coordinate pairs are initially represented using a first binary representation and are then encoded into a more convenient second binary representation, but without any loss of resolution in the data. The step of encoding comprises mapping at least one of the tessellation vertex coordinate pairs to a mapped coordinate pair that can be represented using the second binary representation, wherein the mapped coordinate pair defines a location within an area of the parameter space that would otherwise be unused, invalid and/or unreachable for the vertices of the tessellation primitives for the patch.

15 Claims, 11 Drawing Sheets

GRAPHICS PROCESSING

BACKGROUND

The technology described herein relates to the processing of graphics, e.g., for display on a display screen.

It is common in graphics processing systems to render objects for display by sub-dividing the surface of each object into a number of similar basic components called "primitives" to allow the graphics processing operations to be more easily carried out. These primitives are usually in the form of simple polygons, such as triangles.

The graphics primitives are usually generated by the applications program interface for the graphics processing system, using the graphics drawing instructions (requests) received from the application (e.g. game) that requires the graphics output.

Each primitive at this stage is usually defined by and represented as a set of vertices. Each vertex for a primitive has associated with it a set of data (such as position, colour, texture and other attributes data) indicating the properties of the primitive at that vertex. This data is then used, for example, when rasterising and rendering the primitives in order to generate the desired output of the graphics processing system. Once primitives and their vertices have been generated and defined, they can be processed by the graphics processing system in order, for example, to display the object that they relate to.

One way to display the surface of an object more accurately and therefore realistically is to increase the number of primitives and vertices used to represent the object. However, this additional information sometimes may not be needed, for example if the object is being viewed from far away or its surface is at a shallow angle to the viewer, such that finer detail in the surface geometry will not be visible in the rendered output even if it is generated (rendered). In such circumstances, it is a waste of processing resources to process a large number of primitives representing the finer detail of the object.

It is possible to represent the surface geometry of objects with larger "patches", and to then tessellate additional "tessellation primitives" within a patch in the graphics processing pipeline, if required, in order to display a finer level of detail of the object. Such a patch is therefore a graphical entity that represents some or all of an object to be displayed (rendered). Two common patch shapes are triangular and quadrilateral (e.g. square). This process is referred to as "tessellation", and is present in, for example, modern versions of OpenGL and Direct3D.

FIG. 1 depicts a tessellation stage 10 as implemented in OpenGL and Direct3D, which includes two shader stages 11, 13 and a fixed-function tessellator or primitive generator 12.

The hull shader (using Direct3D terminology) or control shader (using OpenGL terminology) 11 is operable to receive a patch (e.g. from upstream stages of the graphics processing pipeline), and to, inter alia, calculate a "tessellation factor". The tessellation factor defines the degree of tessellation required, and thus the number of tessellation primitives that will be generated by the tessellation process. The hull or control shader 11 may also modify the patch in some way.

The tessellation factor is passed to the primitive generator 12, which operates to tessellate a patch to the required degree. The primitive generator 12 typically operates on the patch in an abstract 2D parameter space. A patch may, for example, be tessellated into a plurality of triangular tessellation primitives in the parameter space. FIG. 2 shows an example of a triangular patch 14 in a parameter space and FIG. 3 shows an example of a quadrilateral patch 15 in the same parameter space. In both cases, the primitive generator 12 operates to divide up the patch 14,15 into smaller triangular tessellation primitives, where the number of tessellation primitives depends on the tessellation factor. In both cases shown, the tessellation factor is 15. This results in there being 15 tessellation primitives along each edge of the patch 14,15.

The set of tessellation primitives is typically described by a set of tessellation vertex coordinate pairs (U,V) that define locations in the parameter space that represent positions for the vertices of the tessellation primitives. The set of tessellation primitives is also typically described by information defining the connectivity between the vertices (i.e. how the vertices are to be "joined up" to produce the set of tessellation primitives). This connectivity information is calculated by the primitive generator 12.

The domain shader (using Direct3D terminology) or evaluation shader (using OpenGL terminology) 13 receives the output patch from the control shader 11 as well as the tessellation vertex coordinate pairs from the primitive generator 12, and then operates to apply the tessellation vertex coordinate pairs onto the output patch so as to calculate the positions of vertices for the tessellation primitives for the output patch.

A downstream primitive assembly stage 20 assembles the tessellation primitives using the calculated positions from the domain or evaluation shader 13 and the connectivity information from the primitive generator 12, and then passes the assembled tessellation primitives to further downstream stages of the graphics processing pipeline for further processing, such as rasterisation and rendering, etc., in the usual manner.

In one example, each tessellation vertex coordinate pair generated by the primitive generator 12 is represented by 34 bits. However, such a 34 bit representation can be very inefficient, particularly if the primitive generator 12 is implemented as a series of compute-shaders rather than a fixed-function unit. This is because compute-shaders usually require access to memory, and memory accesses are generally made in powers of 2, e.g. 32 bits, 64 bits etc. Thus, such a 34 bit representation would generally need to be expanded to 64 bits before being written to memory, and this can result in a large amount of wasted bandwidth. It may of course be possible simply to reduce the number of bits in the representation used for the tessellation vertex coordinate pairs in this example, but this simplistic approach would inevitably lead to a loss of resolution in the data.

As will be appreciated, in graphics processors, e.g. in portable devices, it is generally desirable to try to reduce the amount of bandwidth and memory required to transfer, store and access data (e.g. data needed to generate an image for display) where possible, but without a corresponding reduction in the resolution of the data.

The Applicants believe that there remains scope for improvements to techniques for processing graphics data, and in particular to arrangements where tessellation is provided and used.

BRIEF DESCRIPTION OF THE DRAWINGS

A number of embodiments of the technology described herein will now be described by way of example only and with reference to the accompanying drawings, in which.

Like reference numerals are used for like components where appropriate in the drawings.

DETAILED DESCRIPTION

Figure 1:
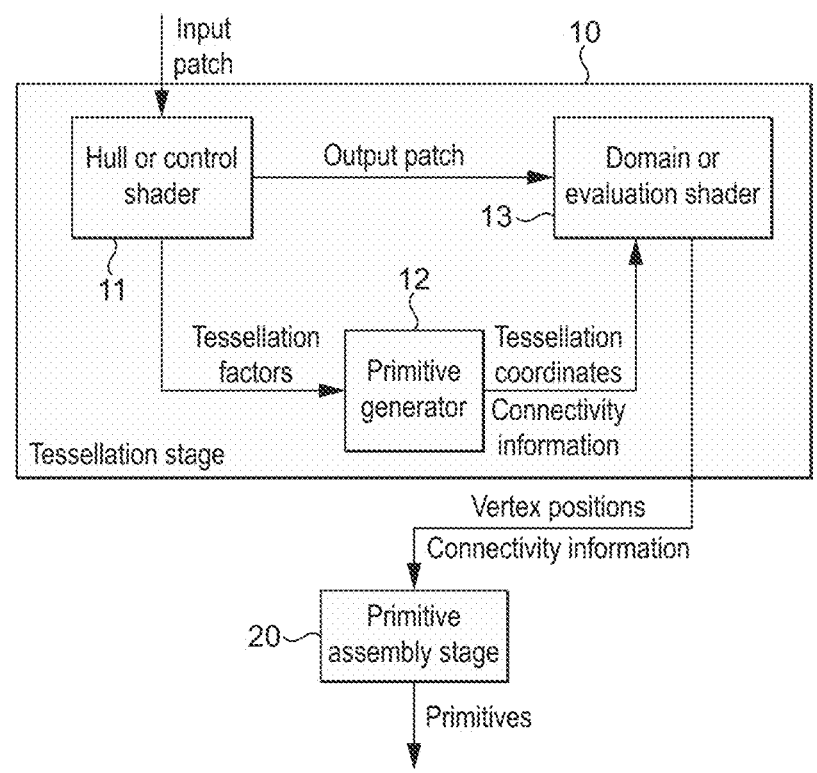
FIG. 1 shows schematically a portion of a conventional graphics processing pipeline comprising a tessellation stage.
Figure 2:
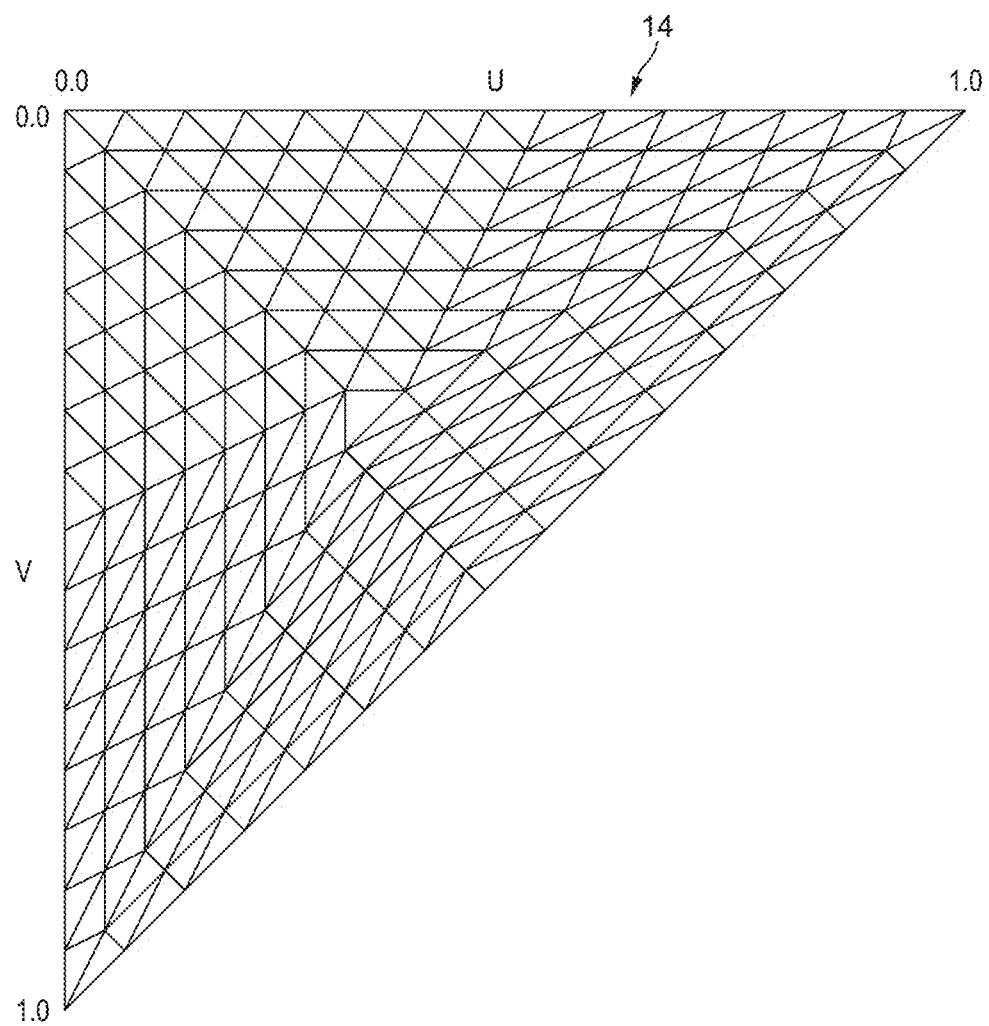
FIG. 2 shows a tessellated triangular patch.
Figure 3:
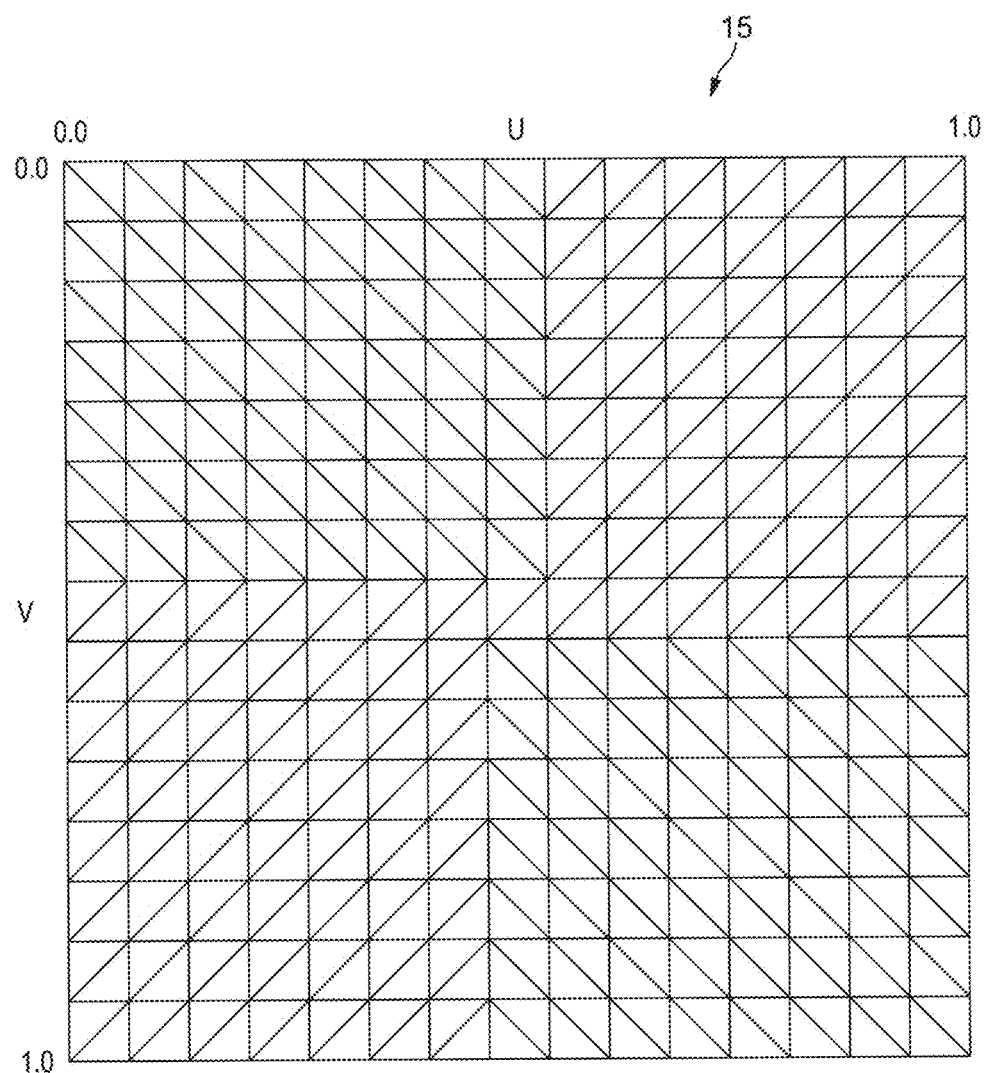
FIG. 3 shows a tessellated quadrilateral patch.

An embodiment of the technology described herein comprises a method of operating a graphics processing pipeline that comprises a tessellation stage, the method comprising:

the tessellation stage tessellating a patch that represents at least some or all of an object to be rendered, wherein tessellating the patch comprises:

generating a tessellation vertex coordinate pair for a vertex of a tessellation primitive for the patch, the tessellation vertex coordinate pair being represented using a first binary representation; and encoding the tessellation vertex coordinate pair that is represented using the first binary representation into a second binary representation, wherein encoding the tessellation vertex coordinate pair comprises:

mapping the tessellation vertex coordinate pair that is represented using the first binary representation to a mapped coordinate pair that can be represented using the second binary representation; and representing the mapped coordinate pair using the second binary representation.

Another embodiment of the technology described herein comprises a graphics processing system comprising:

processing circuitry for a tessellation stage of a graphics processing pipeline, the processing circuitry for the tessellation stage being configured to tessellate a patch that represents at least some or all of an object to be rendered, wherein when tessellating the patch the processing circuitry for the tessellation stage is configured to:

generate a tessellation vertex coordinate pair for a vertex of a tessellation primitive for the patch, the tessellation vertex coordinate pair being represented using a first binary representation; and encode the tessellation vertex coordinate pair that is represented using the first binary representation into a second binary representation, wherein when encoding the tessellation vertex coordinate pair the processing circuitry for the tessellation stage is configured to:

map the tessellation vertex coordinate pair that is represented using the first binary representation to a mapped coordinate pair that can be represented using the second binary representation; and represent the mapped coordinate pair using the second binary representation.

In the technology described herein, a tessellation vertex coordinate pair (e.g. that defines a location within a (2D) parameter space) for a vertex of a tessellation primitive for a patch is initially represented using a first binary representation. The tessellation vertex coordinate pair is then encoded using a second binary representation. The encoding includes mapping the tessellation vertex coordinate pair to a mapped coordinate pair (e.g. that defines an alternative or mapped location with the parameter space) for the vertex that can be represented using the second binary representation.

The technology described herein accordingly provides a way for the tessellation vertex coordinate pair that is initially represented using a first binary representation to be encoded into an, e.g. more convenient, second binary representation. In particular, the Applicants have identified that, when tessellating a patch, there will in practice be some unused, invalid and/or unreachable coordinate pairs (e.g. that define unused, invalid and/or unreachable locations) for vertices for tessellation primitives for the patch. The Applicants have further identified that these otherwise unused, invalid and/or unreachable coordinate pairs can be used in lieu of the actual, valid and/or reachable tessellation vertex coordinate pairs (e.g. that define the actual, valid, and/or reachable locations) for vertices for tessellation primitives for the patch, so as to allow a tessellation vertex coordinate pair that is represented using the first binary representation to be encoded using the second binary representation.

Furthermore, since the tessellation vertex coordinate pair is being mapped (rather than, for example, the first binary representation simply being truncated), the tessellation vertex coordinate pair can readily be recovered or "remapped" from the mapped coordinate pair as and when desired, for example by reversing the mapping process, and there need not be any loss of information nor reduction in data resolution when encoding the tessellation vertex coordinate pair. The technology described herein can therefore, for example, allow the tessellation vertex coordinate pair that is represented using the first binary representation to be encoded using a second binary representation that comprises or consists of (e.g. two) fewer bits than the first binary representation. This can in turn allow the bandwidth and/or memory required to transfer, store and/or access tessellation vertex coordinate pairs to be reduced.

The first binary representation may comprise or consist of n bits, where n is in an embodiment 34. The first binary representation may comprise or consist of m bits per coordinate of the tessellation vertex coordinate pair, where m is in an embodiment n/2, e.g. 17. The first binary representation may comprise a fixed point representation for each coordinate of the tessellation vertex coordinate pair. The fixed point may be positioned directly after the most significant (i.e. non-fractional) bit for each coordinate of the tessellation vertex coordinate pair. The first binary representation may therefore comprise or consist of m−1 fractional bits for each coordinate of the tessellation vertex coordinate pair, where m−1 is in an embodiment 16.

As discussed above, memory accesses are generally made in powers of 2, e.g. 32 bits, 64 bits etc. Thus, the second binary representation in an embodiment comprises or consists of a power of 2 bits, such as 32 bits, 64 bits, etc. This can, for example, allow the graphics processing pipeline to transfer, store and/or access the mapped coordinate pair more efficiently than the tessellation vertex coordinate pair that is represented using the first binary representation. The second binary representation may, for example, comprise or consist of n−2 bits, where n−2 is in an embodiment 32. The second binary representation may comprise or consist of m−1 bits per coordinate of the mapped coordinate pair, where m−1 is in an embodiment 16.

The tessellation vertex coordinate pair in an embodiment comprises a barycentric coordinate pair. The parameter space used for the location defined by the tessellation vertex coordinate pair may therefore be referred to as barycentric space. The area of the parameter space that is addressable using the second binary representation may be smaller than the area of the parameter space that is addressable using the first binary representation. The tessellation vertex coordinate pair may, for example, comprise a pair of coordinates U,V, where $0 \le U, V \le 1$. The mapped coordinate pair may, for example, comprise a pair of coordinates U',V', where $0 \le U'$, $V' < 1$.

As discussed above, the tessellation vertex coordinate pair in an embodiment defines within a parameter space a location that is valid and/or reachable for vertices of tessellation primitives for the patch. For example, the tessellation vertex coordinate pair may define a location within the parameter space that represents a position inside, or along an edge of, the patch.

The mapped coordinate pair in an embodiment also defines a location within the parameter space. However, the mapped coordinate pair in an embodiment defines a location that is invalid and/or unreachable for vertices of tessellation primitives for the patch, i.e. a location which would not otherwise normally be used to represent a vertex of a tessellation primitive for the patch.

For example, the mapped coordinate pair may define a (e.g. invalid) location within the parameter space that represents a position that is outside the patch. In this case, the patch may be triangular. For example, the patch may have vertices at (0,0), (0,1) and (1,0) and the mapped coordinate pair may comprise a pair of coordinates U',V', where U'+V'>1.

The mapped coordinate pair may also or instead define a (e.g. unreachable) location within the parameter space that represents a position that is within the patch but that is in-between locations within the parameter space that represent positions that vertices of tessellation primitives for the patch can (validly) have, for example because of the particular type of tessellation (e.g. "odd" or "even") and/or tessellation factor(s) (e.g. odd or even) used and/or available for use by the tessellation stage. In this case, the patch may be quadrilateral. The patch may have vertices at (0,0), (0,1), (1,0) and (1,1). The mapped coordinate pair may define a location that represents a position that is adjacent (but in an embodiment not at) the edge of the quadrilateral patch. This may, for example, accommodate for "even" tessellation of a quadrilateral patch using an odd tessellation factor, wherein any additional tessellation primitive are added from the centreline(s) of the patch outwards rather than being added adjacent the edge. The mapped coordinate pair may also or instead define a location that represents a position that is adjacent to the centreline(s) of the quadrilateral patch. This may, for example, accommodate for "odd" tessellation of a quadrilateral patch using an even tessellation factor, wherein any additional tessellation primitive are added away from the centreline(s) and/or edges of the patch.

In embodiments, the mapped coordinate pair defines a (e.g. invalid and/or unreachable) location that represents a position that would be outside a first patch having a first shape (e.g. a triangular patch) and that would be within a second patch having a second (different) shape (e.g. a quadrilateral patch), but that is in-between locations that represent positions that vertices of tessellation primitives for the second patch can (validly) have. This can allow, for example, for the same mapping process to be used regardless of the patch shape (e.g. triangular or quadrilateral) being used.

In embodiments, the mapped coordinate pair defines a location that represents a position that is adjacent both to an edge (but in an embodiment not at an edge) and to a centreline of the second patch. This can allow, for example, for the same mapping process to be used regardless of the type of tessellation (e.g. "odd" or "even") and/or tessellation factor (e.g. odd or even) being used.

The step of mapping the tessellation vertex coordinate pair to the mapped coordinate pair may be dependent on the tessellation stage determining that the tessellation vertex coordinate pair should be mapped. The step of encoding may therefore comprise determining that the tessellation vertex coordinate pair should be mapped, and responsive to determining that the tessellation vertex coordinate pair should be mapped, performing the step of mapping the tessellation vertex coordinate pair to the mapped coordinate pair.

The step of determining may, for example, be based on the value of the first and/or second coordinate of the tessellation vertex coordinate pair. For example, it may be determined that the tessellation vertex coordinate pair should be mapped when that pair comprises at least one coordinate having a value that cannot be represented using the second binary representation, e.g. because there are not enough bits available in the second binary representation to represent the value of the at least one coordinate.

Thus, the tessellation vertex coordinate pair that is represented using the first binary representation which is mapped to a mapped coordinate pair that can be represented using the second binary representation in an embodiment comprises at least one coordinate having a value that cannot be represented using the second binary representation.

In these embodiments, the step of determining may comprise considering the most significant (e.g. non fractional) bit(s) of the first and/or second coordinate of the tessellation vertex coordinate pair. For example, it may be determined that the tessellation vertex coordinate pair should be mapped when the most significant (e.g. non fractional) bit of the first and/or second coordinate of the tessellation vertex coordinate pair is 1.

Mapping the tessellation vertex coordinate pair to the mapped coordinate pair may comprise any desired and suitable mapping process. For example, the mapping process may comprise using a look up table or may comprise applying a mapping algorithm or mapping function. The mapping process may comprise mapping (e.g. replacing or altering) one or both of the coordinates of the tessellation vertex coordinate pair (individually or together) so as to provide the mapped coordinate pair.

In embodiments, the particular mapping process used in the step of mapping is dependent on the particular coordinate(s) of the tessellation vertex coordinate pair that cannot be represented using the second binary representation. The step of encoding may therefore further comprise the tessellation stage identifying one or more particular coordinates of the tessellation vertex coordinate pair that cannot be represented using the second binary representation, selecting a mapping process based on the one or more particular coordinates identified, and mapping the tessellation vertex coordinate pair to the mapped coordinate pair using the selected mapping process.

The step of identifying the one or more particular coordinates of the tessellation vertex coordinate pair that cannot be represented using the second binary representation may again be based on the value of the first and/or second coordinate of the tessellation vertex coordinate pair. In these embodiments, the step of identifying the one or more particular coordinates of the tessellation vertex coordinate pair that cannot be represented using the second binary representation may comprise considering the most significant (e.g. non fractional) bit(s) of the first and/or second coordinate of the tessellation vertex coordinate pair. For example, a coordinate of the tessellation vertex coordinate pair may be identified as not being able to be represented using the second binary representation when the most significant (e.g. non fractional) bit of that coordinate is 1.

In embodiments, when (only) the first coordinate (U) of the tessellation vertex coordinate pair cannot be represented using the second binary representation, a first mapping process may be used. The first mapping process may comprise generating a first coordinate (U') of the mapped coordinate pair from a first predetermined set of bits and one or more (e.g. the most significant half of the (e.g. fractional)) bits of the second coordinate (V) of the tessellation vertex coordinate pair. The first mapping process may further comprise generating a second coordinate (V') of the mapped coordinate pair from a second predetermined set of bits and one or more other (e.g. the least significant half of the (e.g. fractional)) bits of the second coordinate (V) of the tessellation vertex coordinate pair. In these embodiments, the first and second predetermined sets of bits in an embodiment limit the mapped coordinate pair to an area of otherwise invalid and/or unreachable locations within the parameter space for vertices of tessellation primitives for the patch. The first predetermined set of bits is also in an embodiment different to the second predetermined set of bits.

The first mapping process is in an embodiment uniquely identifiable, e.g. by the particular predetermined sets of bits used in that first mapping process. This can, for example, allow the tessellation stage later to identify, e.g. when decoding the mapped coordinate pair, that the first mapping process was used.

Alternatively, when (only) a second coordinate (V) of the tessellation vertex coordinate pair cannot be represented using the second binary representation, a second (different) mapping process may be used. The second mapping process may comprise generating a first coordinate (U') of the mapped coordinate pair from a third predetermined set of bits and one or more (e.g. the least significant half of the (e.g. fractional)) bits of the first coordinate (U) of the tessellation vertex coordinate pair. The second mapping process may further comprise generating a second coordinate (V') of the mapped coordinate pair from a fourth predetermined set of bits and one or more other (e.g. the most significant half of the (e.g. fractional)) bits of the first coordinate (U) of the tessellation vertex coordinate. Again, the third and fourth predetermined sets of bits in an embodiment limit the mapped coordinate pair to an area of otherwise invalid and/or unreachable locations within the parameter space for vertices of tessellation primitives for the patch. The third predetermined set of bits is also in an embodiment different to the fourth predetermined set of bits.

The second mapping process is in an embodiment uniquely identifiable e.g. by the particular predetermined sets of bits used in that second mapping process. This can, for example, allow the tessellation stage later to identify, e.g. when decoding the mapped coordinate pair, that the second mapping process was used.

In the above, the fourth predetermined set of bits may be the same as the first predetermined set of bits. Similarly, the third predetermined set of bits may be the same as the second predetermined set of bits. However, as discussed above, the first mapping process is in an embodiment distinguishable from the second mapping process, e.g. by the particular predetermined sets of bits used in those processes. Thus, the third predetermined set of bits may be different to the first predetermined set of bits, and/or the fourth predetermined set of bits may be different to the second predetermined set of bits.

Alternatively, when both the first coordinate (U) and the second coordinate (V) of the tessellation vertex coordinate pair cannot be represented using the second binary representation, a third (different) mapping process may be used. The third mapping process may comprise generating a first coordinate (U') of the mapped coordinate pair from fifth and sixth predetermined sets of bits. The third mapping process may further comprise generating a second coordinate (V') of the mapped coordinate pair from seventh and eighth predetermined sets of bits. The fifth, sixth, seventh and eighth predetermined sets of bits in an embodiment define an otherwise invalid and/or unreachable location within the parameter space for vertices of tessellation primitives for the patch.

The third mapping process is in an embodiment uniquely identifiable e.g. by the particular predetermined sets of bits used in that third mapping process. This can, for example, allow the tessellation stage later to identify, e.g. when decoding the mapped coordinate pair, that the third mapping process was used.

(As will be discussed in more detail below, a mapping process may not be carried out in respect of one or more other tessellation vertex coordinate pairs generated by the tessellation stage, for example when it is determined by the tessellation stage that mapping should not or need not be used for those one or more other tessellation vertex coordinate pairs. Thus, in an embodiment, when it is determined that both the first coordinate (U) and the second coordinate (V) of one or more other tessellation vertex coordinate pairs can be represented using the second binary representation, no mapping is carried out in respect of those one or more other tessellation vertex coordinate pairs. However, those one or more other tessellation vertex coordinate pairs may nevertheless be encoded into the second binary representation by the tessellation stage. This encoding may comprise truncating the first and/or second coordinates of the one or more other tessellation vertex coordinate pairs, for example by removing the most significant (non-fractional) bit(s) of the first and/or second coordinates, and representing the truncated first and second coordinates using the second binary representation.)

In embodiments, the step of mapping is carried out using a processing unit that comprises an (e.g. n−2 or 32 bit) accumulator. The unit is in an embodiment configured to receive the bits of the first coordinate of the tessellation vertex coordinate pair and (e.g. subsequently) to receive the bits of the second coordinate of the tessellation vertex coordinate pair. The unit may also be configured to receive and/or access the above-mentioned predetermined sets of bits as appropriate for the particular mapping process being used.

Initially, the bits of the first coordinate may be received by the processing unit and stored in the accumulator. One or more (e.g. the most significant half of the (e.g. fractional)) bits of the first coordinate may be stored in two places in the accumulator. As will be discussed in more detail below, this can avoid the need to relocate those one or more bits within the accumulator later on in the mapping process.

The bits of the second coordinate may then be received by the processing unit. At this point, the processing unit may determine the mapping process to use, for example based on the value and/or most significant (e.g. non fractional) bit(s) of the first and/or second coordinate of the tessellation vertex coordinate pair as discussed above. For example, the unit may carry out the above-mentioned first mapping process when the most significant (e.g. non fractional) bit of the first coordinate is 1 and the most significant (e.g. non fractional) bit of the second coordinate is 0. Alternatively, the unit may carry out the above-mentioned second mapping process when the most significant (e.g. non fractional) bit of the first coordinate is 0 and the most significant (e.g. non fractional) bit of the second coordinate is 1. Alternatively, the unit may carry out the above-mentioned third mapping process when the most significant (e.g. non fractional) bit of the first coordinate is 1 and the most significant (e.g. non fractional) bit of the second coordinate is 1.

(As indicated above, and as will be discussed in more detail below, the unit may not carry out a mapping process in respect of one or more other tessellation vertex coordinate pairs generated by the tessellation stage, for example when it is determined by the unit that no mapping should or need be used. For example, when the most significant (e.g. non fractional) bit of both the first coordinate (U) and the second coordinate (V) of the one or more other tessellation vertex coordinate pairs is 0, then no mapping may be carried out in respect of those one or more other tessellation vertex coordinate pairs. However, the one or more other tessellation vertex coordinate pairs may nevertheless be encoded into the second binary representation using the accumulator. In this case, the (e.g. fractional) bits of the second coordinate may simply be copied to the accumulator as appropriate. The (e.g. fractional) bits of the first coordinate of the tessellation vertex coordinate pair in an embodiment are not overwritten in this process. As discussed above, there is in an embodiment no need to relocate bits of the first coordinate of the tessellation vertex coordinate pair within the accumulator since they are in an embodiment already present and correctly located. The accumulator will therefore contain an encoded (but unmapped) tessellation vertex coordinate pair.)

When the first mapping process is being used, the first and second predetermined sets of bits and appropriate (e.g. fractional) bits of the second coordinate of the tessellation vertex coordinate pair may be copied to appropriate locations in the accumulator. The bits of the first coordinate of the tessellation vertex coordinate pair present in the accumulator are in an embodiment overwritten in this process since they are no longer needed.

When the second mapping process is being used, the third and fourth predetermined sets of bits may be copied to appropriate locations in the accumulator. The appropriate (e.g. fractional) bits of the first coordinate of the tessellation vertex coordinate pair in an embodiment are not overwritten in this process. As discussed above, there is in an embodiment no need to relocate bits of the first coordinate of the tessellation vertex coordinate pair within the accumulator since they are in an embodiment already present and correctly located.

When the third mapping process is being used, the fifth, sixth, seventh and eighth predetermined sets of bits may be copied to appropriate locations in the accumulator. The bits of the first coordinate of the tessellation vertex coordinate pair present in the accumulator are in an embodiment overwritten in this process since they are no longer needed.

In practice, there may be plural vertices for the tessellation primitive and/or there may be plural tessellation primitives for the patch. Thus, tessellating the patch may comprise generating plural tessellation vertex coordinate pairs, with each tessellation vertex coordinate pair being represented using the first binary representation.

In broader embodiments, it may be that only one of the tessellation vertex coordinate pairs that is represented using the first binary representation is encoded into the second binary representation in a manner as discussed above. However, in practice, plural of the tessellation vertex coordinate pairs that are represented using the first binary representation may be encoded into the second binary representation in a manner as discussed above. Thus, an encoding process as discussed above may be carried out in respect of each one of plural tessellation vertex coordinate pairs.

Similarly, in broader embodiments, it may be that only one of the tessellation vertex coordinate pairs that is represented using the first binary representation is mapped to a mapped coordinate pair that can be represented using the second binary representation in a manner as discussed above. However, in practice, encoding the tessellation vertex coordinate pairs may comprise mapping plural of the tessellation vertex coordinate pairs represented using the first binary representation to respective mapped coordinate pairs that can be represented using the second binary representation in a manner as discussed above. Thus, a mapping process as discussed above may be carried out in respect of each one of plural tessellation vertex coordinate pairs. The mapped coordinate pairs may then each be represented using the second binary representation.

As discussed above, it may also be the case that for one or more other tessellation vertex coordinates pairs that are generated by the tessellation stage and that are represented using the first binary representation, it is determined by the tessellation stage that no mapping is to be carried out. However, the one or more other tessellation vertex coordinate pairs may nevertheless still be encoded into the second binary representation (i.e. without mapping) as discussed above. In this case, encoding the one or more other tessellation vertex coordinate pairs may comprise truncating the first and/or second coordinates of the respective tessellation vertex coordinate pairs, for example by removing the most significant (e.g. non-fractional) bit(s) of the first and second coordinates, and representing the truncated first and second coordinates using the second binary representation. This encoding in an embodiment does not affect the resolution of the one or more other tessellation vertex coordinates pairs, since the truncated part (e.g. the most significant (e.g.

non-fractional) bit(s)) of the first and second coordinates in an embodiment has the value zero. As discussed above, this encoding may be performed using a unit that comprises an accumulator.

In some embodiments, prior to the step of mapping, the first and/or second coordinate of the tessellation vertex coordinate pair may be modified. This modification process may, for example, have the effect of moving the invalid and/or unreachable locations for vertices for tessellation primitives for the patch such that those locations lie adjacent to, rather than straddle, the centreline(s) of the parameter space and/or patch being used. This in turn may make the encoding process less expensive to implement, for example in hardware.

The modification process is in an embodiment easily reversible. For example, the modification process may be self-inverse, i.e. applying the modification process again will in an embodiment undo the modification. Alternatively, the modification process may be invertible, i.e. applying an inverse of the modification process will in an embodiment undo the modification.

The modification of the first and/or second coordinate in an embodiment comprises inverting one or more bits of the coordinate in question. The remaining bits of the coordinate in question in an embodiment are not inverted in the modification process. This particular modification process can be less expensive to implement, e.g. in hardware. Alternatively, the modification of the first and/or second coordinate may comprise adding or subtracting a constant modifying value (e.g. 0x80) to the coordinate in question.

The first and/or second coordinate of the tessellation vertex coordinate pair may be modified (only) when particular bit conditions for the bits of the coordinate in question are met. The bit conditions may be that one or more pairs of bits (e.g. the most significant pair of (e.g. fractional) bits) of the coordinate are unequal and/or that one or more other particular bits of the coordinate are equal to zero.

The modified tessellation vertex coordinate(s) may then be subject to a mapping process as discussed above.

The step of generating the tessellation vertex coordinate pair and/or encoding the tessellation vertex coordinate pair may be carried out by a primitive generator of the tessellation stage. The primitive generator is in an embodiment implemented as one or more compute-shaders.

The encoded (mapped) tessellation vertex coordinate pair(s) that is represented using the second binary representation may be written out to memory by the (e.g. primitive generator of the) tessellation stage, for example for subsequent use by (e.g. a domain or evaluation shader of) the tessellation stage. The (e.g. domain or evaluation shader of the) tessellation stage may accordingly read the encoded (mapped) tessellation vertex coordinate pair(s) from memory. The (e.g. domain or evaluation shader of the) tessellation stage may then decode (remap) the encoded (mapped) tessellation vertex coordinate pair(s) prior to use.

The (e.g. domain or evaluation shader of the) tessellation stage is in an embodiment further operable to generate a position for the vertex for the tessellation primitive from the encoded (mapped) coordinate pair. Generating the position for the vertex for the tessellation primitive may comprise decoding the encoded (mapped) coordinate pair that is represented using the second binary representation back into the (original) tessellation vertex coordinate pair that was represented using the first binary representation. The position for the vertex for the tessellation primitive can then be generated by the tessellation stage from the decoded tessellation vertex coordinate pair.

Decoding the encoded (mapped) coordinate pair that is represented using the second binary representation may be the reverse of an encoding process as discussed above. Thus, the step of decoding may comprise remapping the mapped coordinate pair represented using the second binary representation to the tessellation vertex coordinate pair that was represented using the first binary representation.

Similarly, remapping the mapped coordinate pair represented using the second binary representation to the tessellation vertex coordinate pair may be the reverse of a mapping process as discussed above.

The step of remapping the tessellation vertex coordinate pair to the mapped coordinate pair may be dependent on the tessellation stage determining that the mapped coordinate pair should be remapped. The step of decoding may therefore further comprise determining that the mapped coordinate pair should be remapped, and responsive to determining that the mapped coordinate pair should be remapped, remapping the tessellation vertex coordinate pair to the tessellation vertex coordinate pair. The step of determining may be based on the value of the first and/or second coordinate of the mapped coordinate pair.

In embodiments, the particular remapping process used is dependent on the particular mapping process that was used to produce the mapped coordinate pair. The step of decoding may therefore further comprise the tessellation stage identifying the particular mapping process that was used to produce the mapped coordinate pair, selecting a remapping process based on the particular mapping process identified, and remapping the mapped coordinate pair back to the tessellation vertex coordinate pair using the selected remapping process. The step of identifying the mapping process used to map the mapped coordinate pair may be based on the value of the first and/or second coordinate of the mapped coordinate pair.

In embodiments, when it is identified that the first mapping process was used to produce the mapped coordinate pair, then a first remapping process may be used. The first remapping process may comprise setting the first coordinate of the tessellation vertex coordinate pair to a predetermined value (e.g. representing 1). The first remapping process may further comprise reassembling the second coordinate of the tessellation vertex coordinate pair from appropriate (non-predetermined) bits of the (e.g. first and second coordinate of the) mapped coordinate pair.

Alternatively, when it is identified that the second mapping process was used to produce the mapped coordinate pair, then a second remapping process may be used. The second remapping process may comprise setting the second coordinate of the tessellation vertex coordinate pair to a predetermined value (e.g. representing 1). The second remapping process may further comprise reassembling the first coordinate of the tessellation vertex coordinate pair from appropriate (non-predetermined) bits of the (e.g. first and second coordinate of the) mapped coordinate pair.

Alternatively, when it is identified that the third mapping process was used to produce the mapped coordinate pair, then a third remapping process may be used. The third remapping process may comprise setting the first coordinate of the tessellation vertex coordinate pair to a predetermined value (e.g. representing 1). The third remapping process may further comprise setting the second coordinate of the tessellation vertex coordinate pair to a predetermined value (e.g. representing 1).

As a result of the above remapping processes, the tessellation vertex coordinate pair may be or is accordingly represented using the first binary representation.

As discussed above, in practice, plural tessellation vertex coordinate pairs may be encoded in embodiments of the technology described herein. Thus, plural tessellation vertex coordinate pairs may correspondingly be decoded in embodiments of the technology described herein. The step of decoding may therefore comprise decoding plural coordinate pairs that are represented using the second binary representation into their respective (original) tessellation vertex coordinate pairs that were represented using the first binary representation.

Similarly, in practice, plural tessellation vertex coordinate pairs may be mapped in embodiments of the technology described herein. Thus, plural tessellation vertex coordinate pairs may correspondingly be remapped in a manner as discussed above. The step of remapping may therefore comprise remapping plural mapped coordinate pairs that are represented using the second binary representation into their respective (original) tessellation vertex coordinate pairs that were represented using the first binary representation.

As is also discussed above, in practice, there may be one or more other tessellation vertex coordinates pairs that are encoded into the second binary representation but that were not mapped to mapped coordinates pairs. Thus, there may be one or more other tessellation vertex coordinates pairs that are represented using the second binary representation that may be determined as needing to be decoded without remapping. Decoding these one or more other tessellation vertex coordinates pairs may comprise expanding the first and/or second coordinates of those coordinate pairs, for example by adding a most significant (e.g. non fractional) bit (e.g. 0) to the first and/or second coordinates of those coordinate pairs. The decoded (original) tessellation vertex coordinate pair may then be or are accordingly represented using the first binary representation.

As discussed above, prior to the mapping process, the first and/or second coordinate of the tessellation vertex coordinate pair may be modified. Thus, subsequent to the remapping process, the first and/or second coordinate of the tessellation vertex coordinate pair may also be (un)modified. This modification process may be the same as a modification process as described above, e.g. when that modification process is self-inverse, or alternatively may be the inverse of a modification process as described above.

Thus, the modification of the first and/or second coordinate may comprise inverting one or more bits of the coordinate in question. The remaining bits of the coordinate in question in an embodiment are not inverted in the modification process. Alternatively, the modification of the first and/or second coordinate may comprise subtracting or adding, as appropriate, a constant modifying value (e.g. 0x80) to the coordinate in question.

Similarly, the first and/or second coordinate of the tessellation vertex coordinate pair may be modified (only) when particular bit conditions for the bits of the coordinate in question are met. The bit conditions may be that one or more pairs of bits (e.g. the most significant pair of (e.g. fractional) bits) of the coordinate are unequal and/or that one or more other particular bits of the coordinate are equal to zero.

The position for the vertex for the tessellation primitive can then be generated from the unmodified tessellation vertex coordinate pair.

The tessellation stage may comprise any suitable stage that is operable to tessellate a patch to generate one or more positions for one or more vertices for one or more tessellation primitives. The tessellation stage in an embodiment generates the one or more positions of the one or more vertices for the one or more tessellation primitives by deriving one or more decoded tessellation vertex coordinate pairs that are then applied to the patch in question to give the actual one or more positions to be used for the one or more vertices. The output of the tessellation stage is in an embodiment an array of the one or more vertices that will then be used by a primitive assembly stage to produce the one or more tessellation primitives for processing by the rest of the graphics processing pipeline.

The tessellation stage may be operable to carry out any desired type of tessellation, such as triangular or quadrilateral tessellation. However, it is in an embodiment operable to carry out triangular tessellation. As discussed above, the tessellation stage may be operable to carry out tessellation of any desired patch shape, such as a triangular and/or a quadrilateral (e.g. square) patch.

The tessellation stage is in an embodiment operable to carry out a number of (shader) operations as part of the tessellation operation. For example, the tessellation stage may carry out three main tessellation (shader) operations as described below.

A first (shader) operation in an embodiment receives the (input) patch, and calculates a tessellation factor. A type of tessellation (e.g. "odd" or "even") to use may also be specified at this stage. In one embodiment, the patch may also be modified in some way by the first operation so as to generate an output patch. In an embodiment, the first operation is carried out by a hull or control shader. The tessellation factor in an embodiment defines the degree of tessellation required, and thus the number of primitives that will be generated by the tessellation process. As discussed above, the tessellation factor for a patch may comprise a number which defines the number of tessellation primitives required along each edge of the patch. The manner in which the tessellation factor is calculated is in an embodiment defined by the configuration of the first operation (hull or control shader), and may depend, for example, on the position of the camera (view point) in the scene to be displayed.

A second (shader) operation in an embodiment receives the tessellation factor and tessellates (divides up) the patch (e.g. into a plurality of tessellation primitives) to the required degree (i.e. depending on the tessellation factor). The second operation in an embodiment generates (calculates) one or more tessellation vertex coordinate pairs that will be used to define positions for the one or more vertices for the one or more tessellation primitives that the patch is divided into. In the case of triangular tessellation, the second operation in an embodiment operates on the patch, i.e. to tessellate the patch, so as to produce one or more tessellation vertex coordinate pairs that define one or more triangular tessellation primitives.

The second operation also in an embodiment encodes (maps) the one or more tessellation vertex coordinate pairs in a manner as discussed above. The one or more tessellation primitives into which the patch is divided are therefore in an embodiment defined by one or more encoded (mapped) coordinate pairs.

The one or more tessellation primitives into which the patch is divided may also be defined by information defining the connectivity between tessellation vertex coordinate pairs (i.e. information defining how to "join up" tessellation vertex coordinate pairs). The information defining the connectivity between tessellation vertex coordinate pairs is equivalent to (and is) the information that defines the connectivity between vertices. The primitive generator may determine and generate the connectivity information.

In an embodiment, the second operation is carried out by a primitive generator. In embodiments, the primitive generator is implemented as one or more compute-shaders.

A third operation of the tessellation stage in an embodiment receives the (output) patch from the first operation, along with the one or more encoded (mapped) coordinate pairs from the second operation, decodes (remaps) the one or more coordinate pairs into one or more (original) tessellation vertex coordinate pairs in a manner as discussed above, and applies the one or more tessellation vertex coordinate pairs to the patch, in an embodiment so as to calculate the one or more positions of the one or more vertices (i.e. to calculate the one or more positions of the one or more vertices for the one or more primitives into which the patch is being tessellated). In an embodiment, the third operation is carried out by a domain or evaluation shader.

The graphics processing pipeline may further comprise a primitive assembly stage configured to assemble the one or more tessellation primitives using the one or more positions for the one or more vertices generated by the tessellation stage.

The primitive assembly stage in an embodiment is operable to assemble the one or more tessellation primitives for processing, e.g. by one or more processing stages of the graphics processing pipeline downstream of the primitive assembly stage. The primitive assembly stage may be any suitable such stage that assembles primitives using the one or more positions of the one or more vertices and, optionally, information defining the connectivity between vertices. The primitive assembly stage is in an embodiment operable to use the one or more positions for the one or more vertices from the tessellation stage and, optionally, information defining the connectivity between vertices from the tessellation stage.

The graphics processing pipeline in an embodiment further comprises a plurality of processing stages downstream of the primitive assembly stage, including at least a rasteriser operable to rasterise the assembled one or more tessellation primitives to generate graphics fragments to be processed, and a renderer operable to process fragments generated by the rasteriser to generate rendered fragment data.

The tessellation primitives assembled by the primitive assembly stage are in an embodiment processed by remaining processing stages of the graphics processing pipeline, such as a rasteriser and a renderer.

The rasteriser of the graphics processing pipeline may generate graphics fragments to be rendered, in an embodiment to generate rendered graphics data for sampling points of the desired graphics output, such as a frame to be displayed. Each graphics fragment that is generated by the rasteriser in an embodiment has associated with it a set of sampling points of the graphics output and is to be used to generate rendered graphics data for one or more of sampling points of the set of sampling points associated with the fragment.

The rasteriser may be configured to generate the fragments for rendering in any desired and suitable manner. It may receive e.g. primitives to be rasterised, test those primitives against sets of sampling point positions, and generate fragments representing the primitives accordingly.

The renderer should in an embodiment process the fragments generated by the rasteriser to generate rendered fragment data for (covered) sampling points that the fragments represent. These rendering processes may include, for example, fragment shading, blending, texture-mapping, etc. The renderer is in an embodiment in the form of a programmable fragment shader.

The graphics processing pipeline may also contain any other suitable and desired processing stages that a graphics processing pipeline may contain such as an early depth (or an early depth and stencil) tester, a late depth (or depth and stencil) tester, a blender, etc.

As will be appreciated, the patch is a graphical entity that represents some or all of an object, e.g. some or all of the surface of an object, to be rendered. The patch may be a surface, such as a Bézier surface, and may be defined by a plurality of control points. The patch may be generated by the application program interface for the graphics processing system, e.g. using graphics drawing instructions (requests) received from the application (e.g. game) that requires the graphics output, and passed to the tessellation stage for tessellation.

As will be appreciated, although the technology described herein has been described above with particular reference to the processing of a single patch representing all or part of an object to be processed, the technology described herein may be, and is in an embodiment, used for plural patches to be processed (whether for the same or different objects), and is in an embodiment used whenever patch tessellation is required. Thus it will, for example, be repeated for each patch for an object being rendered, and for the patches of each object to be rendered, where tessellation is required. It will therefore be appreciated that as the object to be rendered may be represented by plural patches, in practice the method of the technology described herein may be carried out in respect of plural patches (e.g. each and/or every patch) that is needed to represent the object. It will also be appreciated that as a scene to be displayed may comprise plural objects to be rendered, in practice the method of the technology described herein may be carried out in respect of plural objects (e.g. each and/or every object) that is needed to display the scene.

The actual operation in the manner of the technology described herein can be triggered and controlled as desired. For example, one or more draw calls can be used to trigger the operation by enabling tessellation.

The technology described herein can be used for all forms of output that a graphics processing pipeline or system may be used to generate, such as frames for display, render to texture outputs, etc.

In an embodiment, the various functions of the technology described herein are carried out on a single graphics processing platform that generates and outputs the rendered fragment data that is, e.g., written to the frame buffer for the display device.

In some embodiments, the graphics processing pipeline or system comprises, and/or is in communication with, one or more memories and/or memory devices that store the data described herein, and/or store software for performing the processes described herein. The graphics processing pipeline or system may also be in communication with a host microprocessor, and/or with a display for displaying images based on the data generated by the graphics processor.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements and "means" of the technology described herein may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Subject to any hardware necessary to carry out the specific functions discussed above, the graphics processing pipeline or system can otherwise include any one or more or all of the usual functional units, etc., that graphics processing pipelines or systems include.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. Thus, further embodiments of the technology described herein comprise computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said graphics processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus further broad embodiments of the technology described herein comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

Embodiments of the technology described herein will now be described in the context of the processing of computer graphics for display.

The present embodiment is particularly concerned with the tessellation operation in a graphics processing pipeline. As discussed above, when a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha) data associated with each fragment so that the fragments can be displayed correctly. Once the fragments have fully traversed the renderer, then their associated data values are stored in memory, ready for output, e.g. for display.

Figure 4:
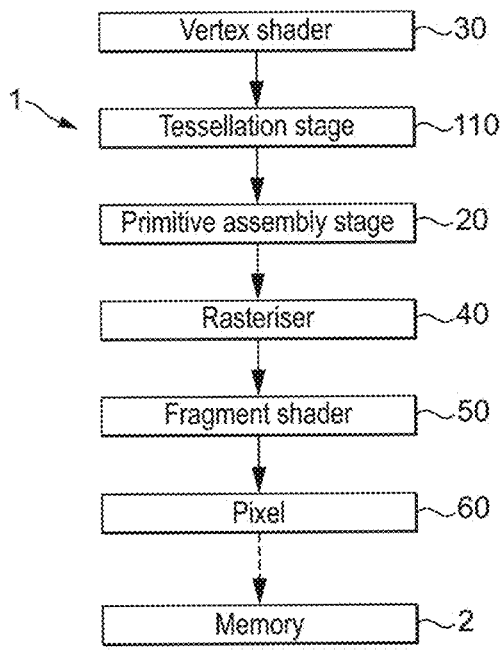
FIG. 4 shows schematically a graphics processing system in accordance with an embodiment of the technology described herein comprising a graphics processing pipeline and a memory.

FIG. 4 shows the main elements of the graphics processing system that are relevant to the operation of the technology described herein. As will be appreciated by those skilled in the art there may be other elements of the graphics processing system that are not illustrated in FIG. 4. It should also be noted here that FIG. 4 is only schematic, and that, for example, in practice the shown functional units and pipeline stages may share significant hardware circuits, even though they are shown schematically as separate stages in FIG. 4.

FIG. 4 shows, schematically, a graphics processing pipeline 1 and a memory 2, which make up part of a graphics processing system for rendering graphics images for display. The pipeline 1 comprises a sequence of different stages, which each perform a different operation on the primitives making up the object to be displayed to prepare them for the final display.

First in the pipeline is a vertex shader 30 which vertex shades the vertices for the output being generated and passes the vertex shaded vertices to a tessellation stage 110.

When the graphics processing pipeline 1 is to produce a desired output, such as a frame to be displayed, the required graphics processing (e.g. frame) will be processed as one or more "draw calls". Each draw call will include one or more graphics objects to be processed. For each draw call, a respective set of vertex data which defines vertices to be used for the draw call is defined. In the present embodiments, each object to be processed is represented by one or more "patches" which each represent a region of the object in question.

The vertex data for the draw call is processed by the vertex shader 30 to transform the virtual three-dimensional positions of the vertices to their two-dimensional positions in screen space.

Once the vertex processing has been completed, it is then determined whether tessellation has been enabled for the draw call. If tessellation has not been enabled, the processing proceeds directly to the primitive assembly stage 20. However, for the purposes of the present description, it will be assumed that tessellation has been enabled. In this case, the next stage in the processing is to carry out tessellation in the tessellation stage 110.

The tessellation stage 110 operates to tessellate a patch into a plurality of smaller tessellation primitives (this will be discussed further below).

The primitive assembly stage 20 downstream of the tessellation stage 110 then assembles the primitives using the positions of the vertices of the primitives and information defining the connectivity between the vertices, and passes the assembled primitives to rasteriser 40.

The rasterisation stage 40 operates to rasterise the primitives making up the render output (e.g. the frame to be displayed) into individual graphics fragments for processing. To do this, the rasteriser 40 receives graphics primitives for rendering, rasterises the primitives to sampling points and generates graphics fragments having appropriate positions (representing appropriate sampling positions) for rendering the primitives. The fragments generated by the rasteriser are then sent onwards to the rest of the pipeline for processing.

The graphics fragments generated by the rasteriser 40 are passed to the fragment shader 50 for rendering (shading). The output of the fragment shading stage is, e.g., a set of, e.g., colour values for each sampling position representing the region of the output in question.

The rendered sampling positions from the fragment shading stage are then processed by a pixel processor 60 to, e.g., downsample the rendered sampling positions to provide rendered pixel data for the pixels that will actually be output (e.g. displayed). The pixel data may then, e.g., be output to main memory 2 (e.g. a frame buffer), e.g. for display.

The operation of the tessellation stage 110 will now be described in more detail with reference to FIG. 5.

Figure 5:
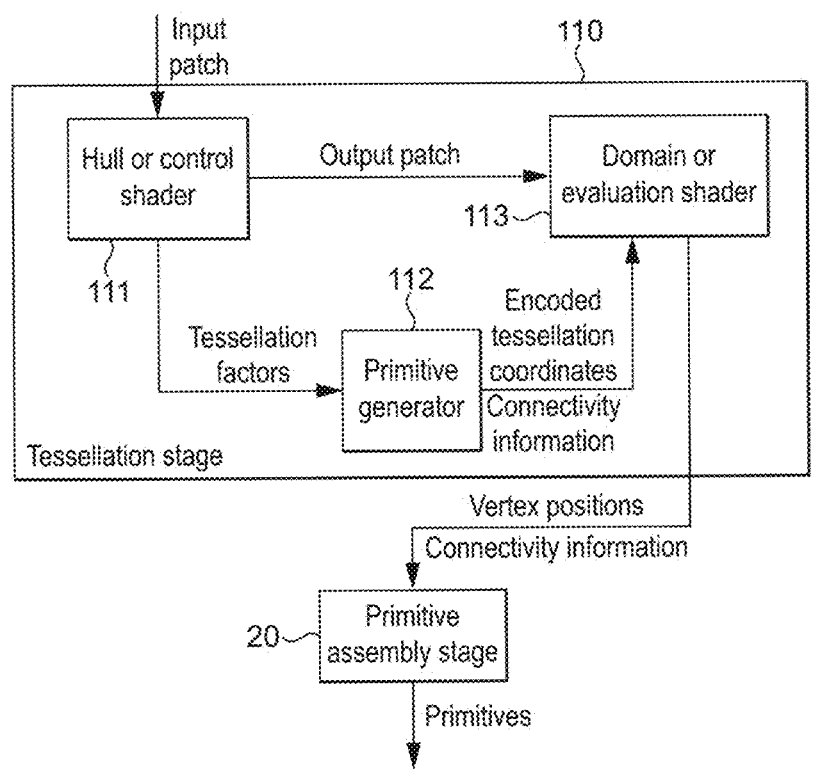
FIG. 5 shows schematically a portion of a graphics processing pipeline in accordance with an embodiment of the technology described herein comprising a tessellation stage.

FIG. 5 shows the main elements of the tessellation stage 110 and the primitive assembly stage 20 that are relevant to the operation of the technology described herein. As will be appreciated by those skilled in the art there may be other elements of these stages that are not illustrated in FIG. 5. It should also be noted here that FIG. 5 is only schematic, and that, for example, in practice the shown functional units and pipeline stages may share significant hardware circuits, even though they are shown schematically as separate stages in FIG. 5.

The tessellation stage 110 of the present embodiment is operable to carry out triangular tessellation.

A first stage 111 of the tessellation stage 110 receives patch data from the vertex shader 30, and calculates a tessellation factor. The manner in which the tessellation factor is calculated may depend, for example, on the position of the camera in the scene to be displayed.

A second stage 112 of the tessellation stage 110 tessellates a patch into a plurality of triangular tessellation primitives, where the number of tessellation primitives produced depends on the tessellation factor.

In the present embodiment, the second stage 112 calculates a set of tessellation vertex coordinate pairs that define within a barycentric parameter space locations that represent the positions of the vertices of the tessellation primitives that the patch is divided into. In this embodiment, the tessellation vertex coordinates are barycentric coordinates (U,V) and range in value from 0.0 to 1.0.

In this embodiment, the tessellation vertex coordinate pairs are each represented by a first binary representation comprising 34 bits. The least significant 17 bits of the first binary representation represent the first coordinate U of the tessellation vertex coordinate pair and the most significant 17 bits of the first binary representation represent the second coordinate V of the tessellation vertex coordinate pair. The coordinates of the tessellation vertex coordinate pair are each represented by a fixed point number comprising 16 fractional bits, such that a coordinate of 0.0 is represented by 0 (i.e. 0 0000 0000 0000 0000) and a coordinate of 1.0 is represented by 65536 (i.e. 1 0000 0000 0000 0000).

In the present embodiment, the second stage 112 encodes the tessellation vertex coordinate pairs into a second binary representation comprising 32 bits. The least significant 16 bits of the second binary representation represent a first coordinate U' of the encoded coordinate pair and the most significant 16 bits of the second binary representation represent a second coordinate V' of the encoded coordinate pair.

In the present embodiment, the encoding process utilises areas of otherwise unused, invalid and/or unreachable locations in the parameter space, i.e. areas that represent positions that vertices for tessellation primitives would not normally have for the patch. These areas will now be explained with reference to FIGS. 6-9.

Figure 6:
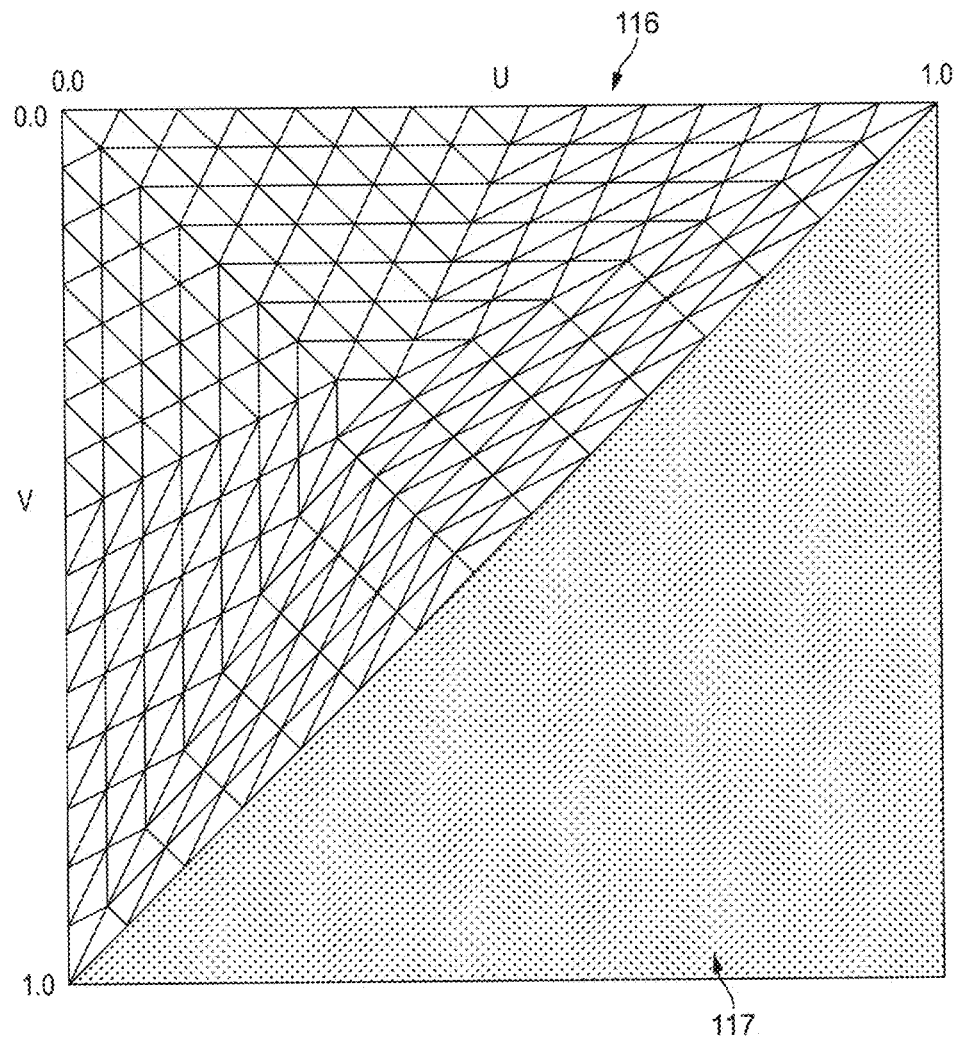
FIG. 6 shows a tessellated triangular patch together with an area that would not normally be used for tessellation vertices indicated by shading.

FIG. 6 shows a triangular patch 116 in the parameter space. The shaded region 117 in the bottom right of the parameter space (i.e. where U+V>1) does not fall with the triangular patch 116. The shaded region 117 may accordingly be used to encode (map) tessellation vertex coordinate pairs since the locations that are in the shaded region 117 are invalid for positions of vertices for the patch 116 and would therefore not otherwise normally be used to represent positions of vertices for the patch 116.

Figure 7:
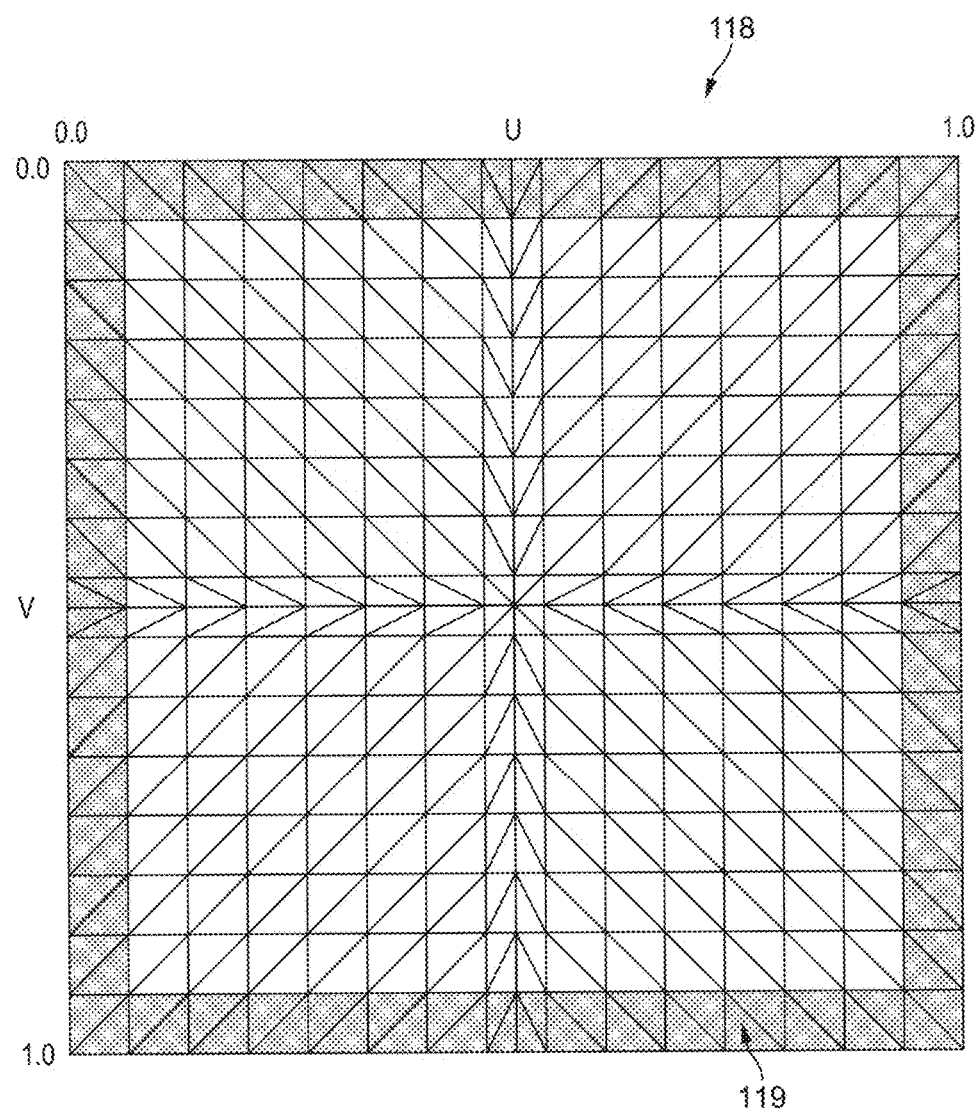
FIG. 7 shows a tessellated quadrilateral patch together with an area that would not normally be used for tessellation vertices indicated by shading.
Figure 8:
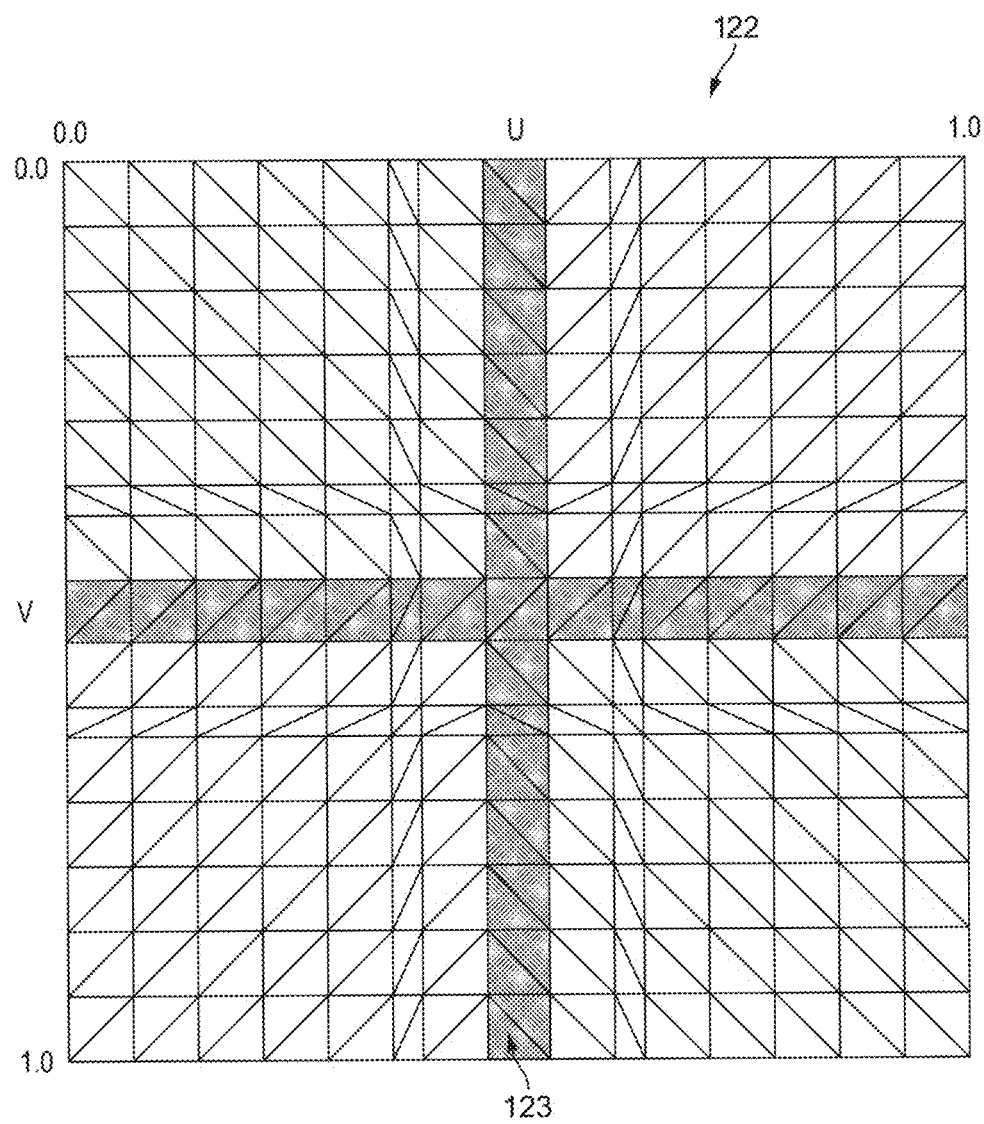
FIG. 8 shows an alternative tessellated quadrilateral patch together with an area that would not normally be used for tessellation vertices indicated by shading.

FIG. 7 shows a square patch 118 in the parameter space. The patch 118 has an odd tessellation factor (15) but has been subjected to "even" tessellation. This causes narrow tessellation primitives to be added along the centrelines of the patch. Since the tessellation primitives are added from the centrelines outwards, there will remain a shaded region 119 adjacent to the edge of the patch 118 that comprises unreachable locations for positions of vertices for the patch 118 and therefore that would not otherwise normally be used to represent positions of vertices for the patch 118. The shaded region 119 may therefore also be used to encode (map) tessellation vertex coordinate pairs.

FIG. 8 again shows a square patch 122 in the parameter space. The patch 122 has an even tessellation factor (14) but has been subjected to "odd" tessellation. This again causes narrower tessellation primitives to be added, but this time away from centrelines of the patch 112. Since the tessellation primitives are added away from the centrelines, there will remain a shaded region 123 along the centrelines that comprises unreachable locations for positions of vertices for the patch 122 and therefore that would not normally be used to represent positions of vertices for the patch 122. The shaded region 123 may therefore also be used to encode (map) tessellation vertex coordinate pairs.

Figure 9:
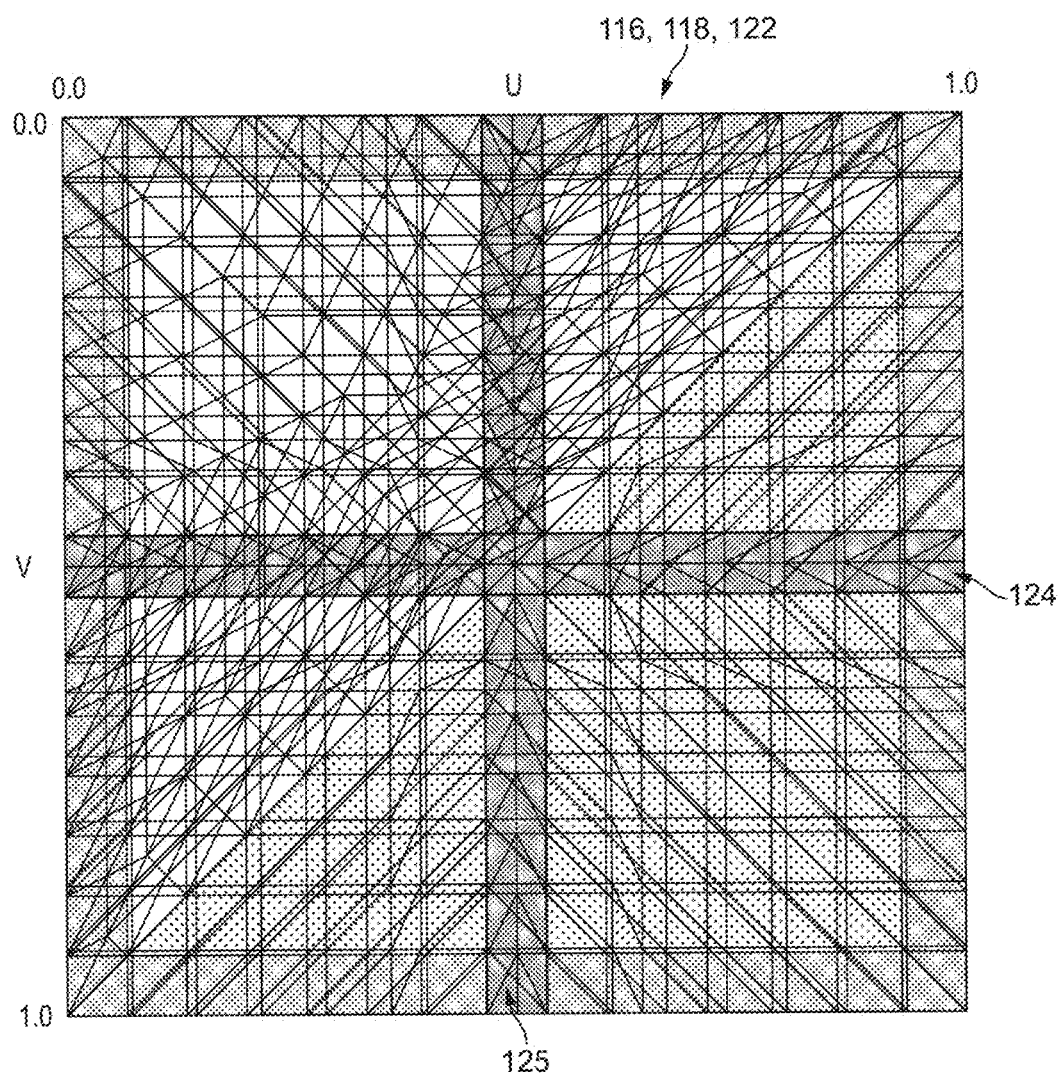
FIG. 9 shows overlaid tessellated triangular and quadrilateral patches together with areas that would not normally be used for tessellation vertices indicated by shading.

FIG. 9 shows the triangular patch 116, square patch 118 and square patch 122 overlaid in the parameter space together with their shaded regions. FIG. 9 shows that there are areas 124,125 that would not otherwise normally be used to represent positions of vertices, regardless of the shape of the patch and regardless of the type of tessellation (odd or even) used. In the present embodiment, the areas 124,125 are accordingly used to encode (map) tessellation vertex coordinate pairs.

The encoding process for a tessellation vertex coordinate pair will now be described with reference to FIGS. 10-15.

Figure 10A:
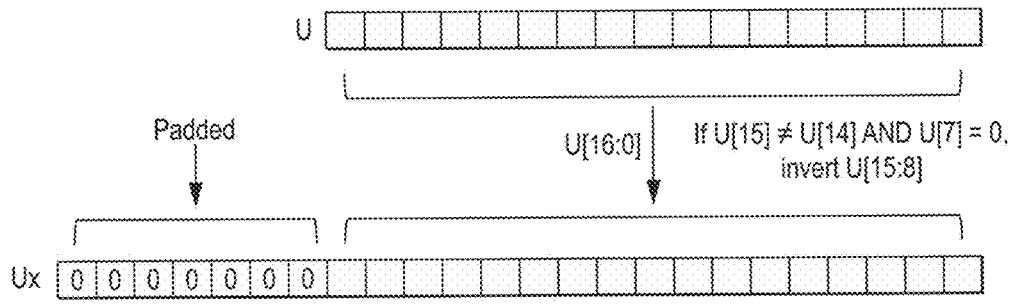
FIGS. 10A and 10B show methods of modifying tessellation vertex coordinates.

As is shown in FIG. 10A, prior to encoding, the first coordinate U of the tessellation vertex coordinate pair is modified so as to generate a modified first coordinate Ux. In this embodiment, Ux comprises 24 bits. Ux is generated by copying U[16:0] to Ux[16:0], but with the condition that when U[15] and U[14] are unequal and U[7] is zero, U[15:8] is inverted before being copied. U[23:17] is padded with zeros.

Figure 10B:
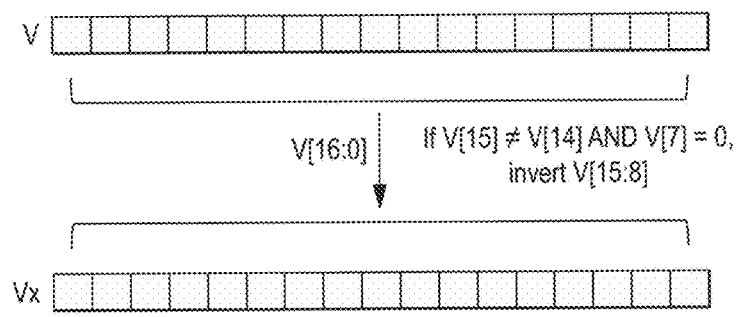

Similarly, prior to encoding, as is shown in FIG. 10B, the second coordinate V of the tessellation vertex coordinate pair is modified so as to generate a modified second coordinate Vx. In this embodiment, Vx comprises 17 bits. Vx is generated by copying V[16:0] to Vx[16:0], but with the condition that when V[15] and V[14] are unequal and V[7] is zero, V[15:8] is inverted before being copied.

The above modifications have the effect of moving the invalid and unreachable locations in the parameter space such that those locations lie adjacent to, rather than straddle, the centreline of the parameter space. This makes the subsequent encoding less expensive in hardware.

Figure 11:
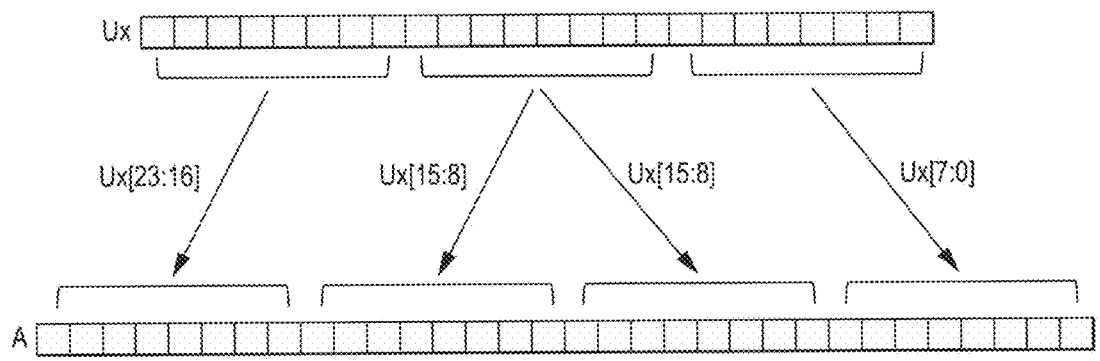
FIG. 11 shows a method of loading an accumulator prior to encoding a tessellation vertex coordinate pair.

As is shown in FIG. 11, Ux is then copied into an accumulator A of a processing unit for the second stage 112 of the tessellation stage 110, such that A[31:16]=Ux[23:8] and A[15:0]=Ux[15:0]. It should be noted here that Ux[15:8] is copied to the accumulator twice. As will be discussed in more detail below, this can avoid the need to relocate Ux[15:8] within the accumulator later on in the encoding process.

At this point, the processing unit for the second stage 112 of the tessellation stage 110 will determine the mapping process (if any) to apply to the tessellation vertex coordinate pair.

Figure 12:
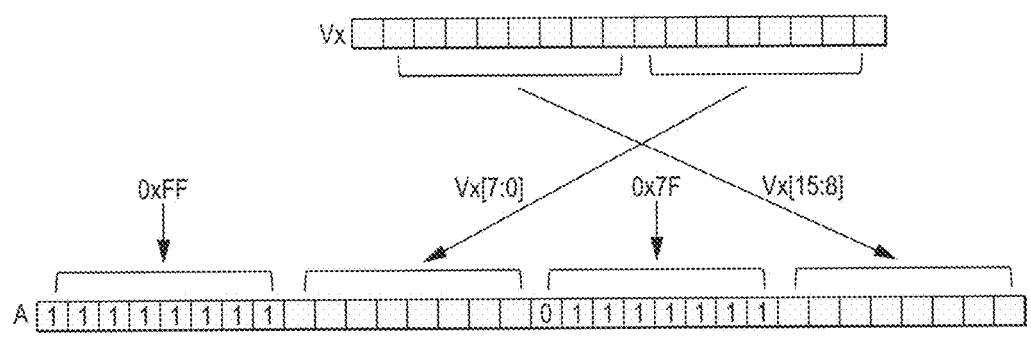
FIG. 12 shows a first mapping process for mapping a tessellation vertex coordinate pair to a mapped coordinate pair as part of a process of encoding a tessellation vertex coordinate pair.

In particular, when A[24]=1 (i.e. Ux[16]=1) and Vx[16]=0, U is 65536 (i.e. 1.0) but V is not. In this case, a first mapping process is used as shown in FIG. 12. Here, Vx[15:8] is copied to A[7:0], a first predetermined set of bits having a value of 0x7F is copied to A[15:8], Vx[7:0] is copied to A[23:16], and a second predetermined set of bits having a value of 0xFF is copied to A[31:24]. This maps the tessellation vertex coordinate pair to area 125 as shown in FIG. 9.

Figure 13:
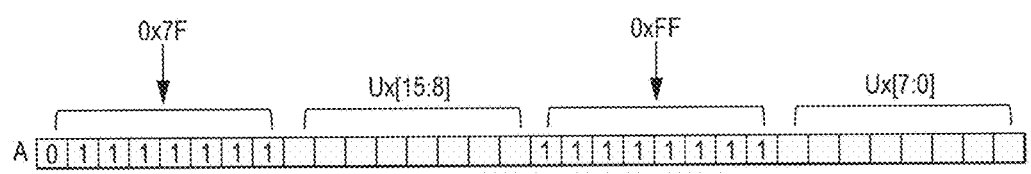
FIG. 13 shows a second mapping process for mapping a tessellation vertex coordinate pair to a mapped coordinate pair as part of a process of encoding a tessellation vertex coordinate pair.

Else, when A[24]=0 (i.e. Ux[16]=0) and Vx[16]=1, V is 65536 (i.e. 1.0) but U is not. In this case, a second mapping process is used as shown in FIG. 13. Here, a third predetermined set of bits having a value of 0xFF is copied to A[15:8] and a fourth predetermined set of bits having a value of 0x7F is copied to A[31:24]. As discussed above, A[23:16] already contains Ux[15:8] and A[7:0] already contains Ux[7:0], so there is no need to copy those bits into the accumulator. This maps the tessellation vertex coordinate pair to area 124 as shown in FIG. 9.

Figure 14:
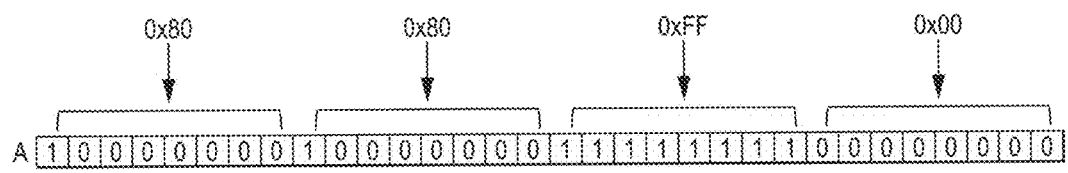
FIG. 14 shows a third mapping process for mapping a tessellation vertex coordinate pair to a mapped coordinate pair as part of a process of encoding a tessellation vertex coordinate pair.
Figure 15:
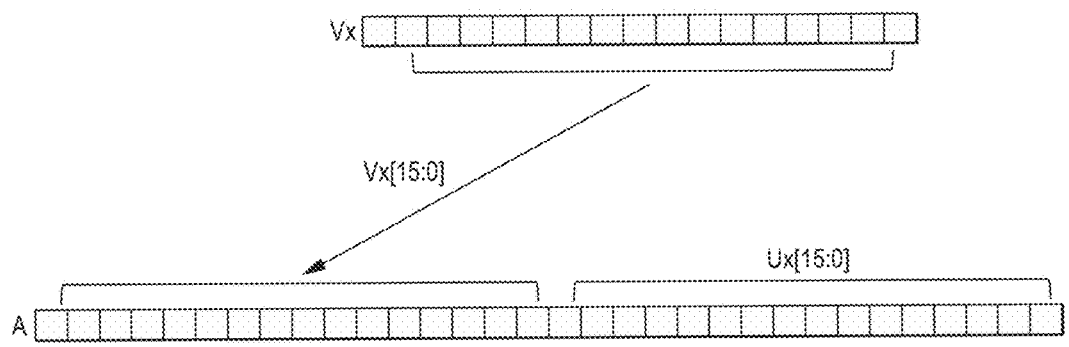
FIG. 15 shows a process of encoding a tessellation vertex coordinate pair without mapping.

Else, when A[24]=1 (i.e. Ux[16]=1) and Vx[16]=1, both U and V are 65536 (i.e. 1.0). In this case, a third mapping process is used as shown in FIG. 14. Here, a fifth predetermined set of bits having a value of 0x00 is copied to A[7:0], a sixth predetermined set of bits having a value of 0xFF is copied to A[15:8], a seventh predetermined set of bits having a value of 0x80 is copied to A[23:16], and an eighth predetermined set of bits having a value of 0x80 is copied to A[31:24]. This maps the tessellation vertex coordinate pair to a unique location in area 124 as shown in FIG. 9.

The result of the above mapping processes is that A[15:0] comprises a first mapped coordinate U' and A[31:16] comprises a second mapped coordinate V' of the mapped coordinate pair that is encoded using the second binary representation.

Alternatively, when A[24]=0 (i.e. Ux[16]=0) and Vx[16]=0, neither U nor V is 65536 (i.e. 1.0). In this case, a mapping process is not applied. However, the tessellation vertex coordinates are still encoded into the second binary representation using the encoding process shown in FIG. 15. Here, Vx[15:0] is copied to A[31:16]. As discussed above, A[15:0] already contains Ux[15:0], so there is no need to copy those bits into the accumulator. The result of this processes is that A[15:0] comprises a first coordinate U' and A[31:16] comprises a second coordinate V' encoded using the second binary representation.

In this embodiment, one of the above encoding (mapping) processes is applied in respect of each tessellation vertex pair, as appropriate, so that a suitable set of encoded (mapped) coordinate pairs are obtained for the patch.

The tessellation vertex coordinate pairs are accordingly encoded by the second stage 112 of the tessellation stage 110 into the second binary representation. Since the second binary representation comprises 32 bits (i.e. a power of 2 bits), rather than 34 bits, the encoded coordinate pairs A[31:0] can be stored more efficiently in memory prior to use by the third stage 113 of the tessellation stage 110. In particular, the present embodiment will save 4 bytes of memory writes and 4 bytes of memory reads per vertex. Thus, assuming a triangular primitive rate of 250 million triangles per second and an estimated 0.6 vertices per triangle (i.e. 150 million vertices per second), the present embodiment may result in a bandwidth saving of 1.2. gigabytes per second.

Although the above encoding (and mapping) can be particularly beneficial in terms of cost and convenience, it will be appreciated that other approaches are of course possible.

In this embodiment, the second stage 112 also calculates connectivity information for the tessellation primitives. The second stage 112 can calculate the connectivity information for the tessellation primitives in any suitable and desired manner, for example using any known and suitable technique for that process.

The third stage 113 of the tessellation stage 110 receives and decodes the encoded coordinate pairs A[31:0]. The decoding process for an encoded coordinate pair A[31:0] is essentially the reverse of the encoding process used to encode that coordinate pair as described above.

Thus, when A[31:24]=0xFF and A[15:8]=0x7F, Ux[16:0] is set to {F1'b1,16'b0} (i.e. 65536) and Vx[16:0] is set to {1'b0, A[7:0], A[23:16]}. Else, when A[31:24]=0x7F and A[15:8]=0xFF, Ux[16:0] is set to {1'b0, A[23:16], A[7:0]} and Vx[16:0] is set to {1'b1,16'b0} (i.e. 65536). Else, when A[31:8]=0x8080FF, Ux[16:0] and Vx[16:0] are both set to {1'b1,16'b0} (i.e. 65536). The result of these decoding processes is that the mapped coordinate pair A[31:0] is decoded (remapped) to the modified coordinate pair Ux, Vx.

Alternatively, when none of the above conditions is met, Ux[16:0] is set to {1'b0, A[15:8], A[7:0]} and Vx[16:0] is set to {1'b0, A[31:24], A[23:16]}. In this case, a remapping process is not applied to the coordinate pair A[31:0]. However, the encoded coordinate pair A[31:0] is still decoded into the modified coordinate pair Ux, Vx.

The first coordinate Ux of the decoded (remapped) coordinate pair is then unmodified so as to obtain the original unmodified first coordinate U. The second coordinate Vx of the decoded (remapped) coordinate pair is also unmodified so as to obtain the original unmodified second coordinate V. This is essentially the same modification process that is described with reference to FIGS. 10A and 10B. Thus, U is obtained by copying Ux[16:0] to U[16:0], but with the condition that when Ux[15] and Ux[14] are unequal and Ux[7] is zero, Ux[15:8] is inverted before being copied. Similarly, V is obtained by copying Vx[16:0] to V[16:0], but with the condition that when Vx[15] and Vx[14] are unequal and Vx[7] is zero, Vx[15:8] is inverted before being copied.

In this embodiment, one of the above decoding (remapping) processes is applied in respect of each encoded coordinate pair so that a suitable set of decoded tessellation vertex coordinate pairs are obtained for the patch.

The third stage 113 of the tessellation stage 110 then applies the decoded tessellation vertex coordinate pairs to the output patch from the first stage 111, so as to calculate the positions of the vertices of the tessellation primitives, i.e. into which the patch is being tessellated.

The output of the tessellation stage 110 is a set of vertex positions and the connectivity information. The primitive assembly stage 20 then assembles the tessellation primitives using the positions generated by the tessellation stage 110 and the connectivity information. Once assembled, the primitive assembly stage 20 passes the tessellation primitives to the downstream stages of the graphics processing pipeline for further processing (as discussed above).

It can be seen from the above that the technology described herein, in embodiments, provides an effective way for the tessellation vertex coordinate pair that is initially represented using a first binary representation to be encoded into a more convenient second binary representation. This is achieved, in embodiments, by mapping at least one tessellation vertex coordinate pair represented using the first binary representation to a mapped coordinate pair that can be represented using the second binary representation, wherein the mapped coordinate pair defines an otherwise unused, invalid and/or unreachable location for vertices for tessellation primitives of the patch.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a graphics processing pipeline that comprises a tessellation stage, the method comprising:
   the tessellation stage tessellating a patch that represents at least some or all of an object to be rendered, wherein tessellating the patch comprises:
      generating a tessellation vertex coordinate pair for a vertex of a tessellation primitive for the patch, the tessellation vertex coordinate pair being represented using a first binary representation;
      encoding the tessellation vertex coordinate pair that is represented using the first binary representation into a second binary representation, wherein encoding the tessellation vertex coordinate pair comprises:
         mapping the tessellation vertex coordinate pair that is represented using the first binary representation to a mapped coordinate pair that can be represented using the second binary representation, wherein the mapped coordinate pair that can be represented using the second binary representation defines within a parameter space a location that represents a position that is:
            outside the patch; or
            within the patch but in-between locations within the parameter space that represents positions that a vertex of a tessellation primitive for the patch can have; and
         representing the mapped coordinate pair using the second binary representation; and
      at least one of transferring, storage and accessing the mapped coordinate pair that is represented using the second binary representation for use when generating a render output.

2. A method as claimed in claim 1, wherein the second binary representation comprises fewer bits than the first binary representation.

3. A method as claimed in claim 1, wherein the step of mapping comprises:
   identifying one or more particular coordinates of the tessellation vertex coordinate pair that cannot be represented using the second binary representation;
   selecting a mapping process based on the identified one or more particular coordinates; and
   mapping the tessellation vertex coordinate pair to the mapped coordinate pair using the selected mapping process.

4. A method as claimed in claim 1, wherein the step of mapping is carried out using an accumulator of a processing unit.

5. A method as claimed in claim 1, further comprising the tessellation stage, prior to the step of mapping, modifying at least one of the first coordinate of the tessellation vertex coordinate pair and the second coordinate of the tessellation vertex coordinate pair.

6. A method as claimed in claim 1, further comprising the tessellation stage writing the mapped coordinate pair that is represented using the second binary representation out to memory.

7. A method as claimed in claim 1, further comprising the tessellation stage generating a position for the vertex of the tessellation primitive from the mapped coordinate pair, wherein generating the position for the vertex for the tessellation primitive comprises:
   decoding the mapped coordinate pair that is represented using the second binary representation back into the tessellation vertex coordinate pair that was represented using the first binary representation; and
   generating a position for the vertex of the tessellation primitive from the tessellation vertex coordinate pair.

8. A graphics processing pipeline comprising:
   a tessellation stage, the tessellation stage being configured to tessellate a patch that represents at least some or all of an object to be rendered, wherein the tessellation stage is configured to:
      generate a tessellation vertex coordinate pair for a vertex of a tessellation primitive for the patch, the tessellation vertex coordinate pair being represented using a first binary representation;
      encode the tessellation vertex coordinate pair that is represented using the first binary representation into a second binary representation, wherein the tessellation stage is configured to:

map the tessellation vertex coordinate pair that is represented using the first binary representation to a mapped coordinate pair that can be represented using the second binary representation, wherein the mapped coordinate pair that can be represented using the second binary representation defines within a parameter space a location that represents a position that is:

outside the patch, or within the patch but in-between locations within the parameter space that represents positions that a vertex of a tessellation primitive for the patch can have; and represent the mapped coordinate pair using the second binary representation; and at least one of transfer, store and access the mapped coordinate pair that is represented using the second binary representation for use when generating a render output.

9. A graphics processing pipeline as claimed in claim 8, wherein the second binary representation comprises fewer bits than the first binary representation.

10. A graphics processing pipeline as claimed in claim 8, wherein the tessellation stage is configured to:

identify one or more particular coordinates of the tessellation vertex coordinate pair that cannot be represented using the second binary representation;

select a mapping process based on the identified one or more particular coordinates; and map the tessellation vertex coordinate pair to the mapped coordinate pair using the selected mapping process.

11. A graphics processing pipeline as claimed in claim 8, wherein the tessellation stage is configured to map the tessellation vertex coordinate pair to the mapped coordinate pair using an accumulator of a processing unit.

12. A graphics processing pipeline as claimed in claim 8, wherein the tessellation stage is configured to, prior to the step of mapping, modify at least one of the first coordinate of the tessellation vertex coordinate pair and the second coordinate of the tessellation vertex coordinate pair.

13. A graphics processing pipeline as claimed in claim 8, wherein the tessellation stage is further configured to write the mapped coordinate pair that is represented using the second binary representation out to memory.

14. A graphics processing pipeline as claimed in claim 8, wherein the tessellation stage is further configured to generate a position for the vertex of the tessellation primitive from the mapped coordinate pair, wherein the tessellation stage is configured to:

decode the mapped coordinate pair that is represented using the second binary representation back into the tessellation vertex coordinate pair that was represented using the first binary representation; and generate a position for the vertex of the tessellation primitive from the tessellation vertex coordinate pair.

15. A non-transitory computer readable storage medium storing computer software code which, when executing on a processor of a graphics processing pipeline that comprises a tessellation stage, performs a method comprising:

the tessellation stage tessellating a patch that represents at least some or all of an object to be rendered, wherein tessellating the patch comprises:

generating a tessellation vertex coordinate pair for a vertex of a tessellation primitive for the patch, the tessellation vertex coordinate pair being represented using a first binary representation;

encoding the tessellation vertex coordinate pair that is represented using the first binary representation into a second binary representation, wherein encoding the tessellation vertex coordinate pair comprises:

mapping the tessellation vertex coordinate pair that is represented using the first binary representation to a mapped coordinate pair that can be represented using the second binary representation, wherein the mapped coordinate pair that can be represented using the second binary representation defines within a parameter space a location that represents a position that is:

outside the patch; or within the patch but in-between locations within the parameter space that represents positions that a vertex of a tessellation primitive for the patch can have; and representing the mapped coordinate pair using the second binary representation; and at least one of transferring, storing and accessing the mapped coordinate pair that is represented using the second binary representation for use when generating a render output.

* * * * *